(12) United States Patent
Shim et al.

(10) Patent No.: US 10,050,259 B2
(45) Date of Patent: Aug. 14, 2018

(54) PRODUCTION METHOD FOR NEGATIVE ELECTRODE ACTIVE MATERIAL FOR LITHIUM SECONDARY BATTERY, AND LITHIUM SECONDARY BATTERY

(71) Applicant: SAMSUNG ELECTRONICS CO., LTD., Suwon-si (KR)

(72) Inventors: Kyueun Shim, Suwon-si (KR); Jumyeung Lee, Suwon-si (KR); Donggyu Chang, Suwon-si (KR); Wooyoung Yang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 43 days.

(21) Appl. No.: 15/108,127

(22) PCT Filed: Aug. 22, 2014

(86) PCT No.: PCT/KR2014/007836
§ 371 (c)(1),
(2) Date: Jun. 24, 2016

(87) PCT Pub. No.: WO2015/102201
PCT Pub. Date: Jul. 9, 2015

(65) Prior Publication Data
US 2016/0329556 A1    Nov. 10, 2016

(30) Foreign Application Priority Data

Dec. 30, 2013 (KR) .......................... 10-2013-0167145

(51) Int. Cl.
*H01M 4/134* (2010.01)
*H01M 4/36* (2006.01)
*H01M 4/1395* (2010.01)
*H01M 10/0525* (2010.01)
*H01M 4/38* (2006.01)
*H01M 10/052* (2010.01)
*H01M 4/62* (2006.01)
*H01M 4/02* (2006.01)

(52) U.S. Cl.
CPC ......... *H01M 4/134* (2013.01); *H01M 4/1395* (2013.01); *H01M 4/36* (2013.01); *H01M 4/386* (2013.01); *H01M 10/0525* (2013.01); *H01M 4/625* (2013.01); *H01M 10/052* (2013.01); *H01M 2004/027* (2013.01)

(58) Field of Classification Search
CPC .......... H01M 10/052; H01M 10/0525; H01M 2004/027; H01M 4/134; H01M 4/1395; H01M 4/36; H01M 4/386; H01M 4/625
See application file for complete search history.

(56) References Cited

U.S. PATENT DOCUMENTS

| 5,539,173 | A | * | 7/1996 | Takahashi | ................ | B23H 5/12 |
| | | | | | | 219/69.14 |
| 5,556,721 | A | * | 9/1996 | Sasaki | ................. | H01M 4/0461 |
| | | | | | | 205/59 |
| 6,383,686 | B1 | | 5/2002 | Umeno et al. | | |
| 6,720,258 | B2 | | 4/2004 | Maa et al. | | |
| 9,257,697 | B2 | | 2/2016 | Oya et al. | | |
| 2009/0239151 | A1 | * | 9/2009 | Nakanishi | ........... | H01M 4/0428 |
| | | | | | | 429/231.95 |
| 2014/0225030 | A1 | | 8/2014 | Dehtiar et al. | | |

FOREIGN PATENT DOCUMENTS

| JP | 2000215887 | 8/2000 |
| JP | 2005190902 | 7/2005 |
| JP | 2005310476 | 11/2005 |
| JP | 2006216374 | 8/2006 |
| KR | 1020020088056 | 11/2002 |
| KR | 1020120129926 | 11/2012 |
| KR | 1020130113749 | 10/2013 |
| WO | 2013025707 | 2/2013 |
| WO | WO 2013151197 A1 * | 10/2013 ........ H01M 10/0566 |

OTHER PUBLICATIONS

International Search Report—PCT/KR2014/007836 dated Dec. 15, 2014.
Written Opinion—PCT/KR2014/007836 dated Dec. 15, 2014.

* cited by examiner

*Primary Examiner* — Carlos Barcena
(74) *Attorney, Agent, or Firm* — Cantor Colburn LLP

(57) ABSTRACT

The present invention relates to a production method for a negative electrode active material for a lithium secondary battery, and to a lithium secondary battery, and provides a production method for a lithium secondary battery negative electrode active material that is produced by mechanically grinding or crushing, in dry or wet conditions, particulate silicon, which is in a secondary particle state formed by agglomerating crystalline and amorphous silicon primary particles.

7 Claims, 6 Drawing Sheets

[Fig. 1]
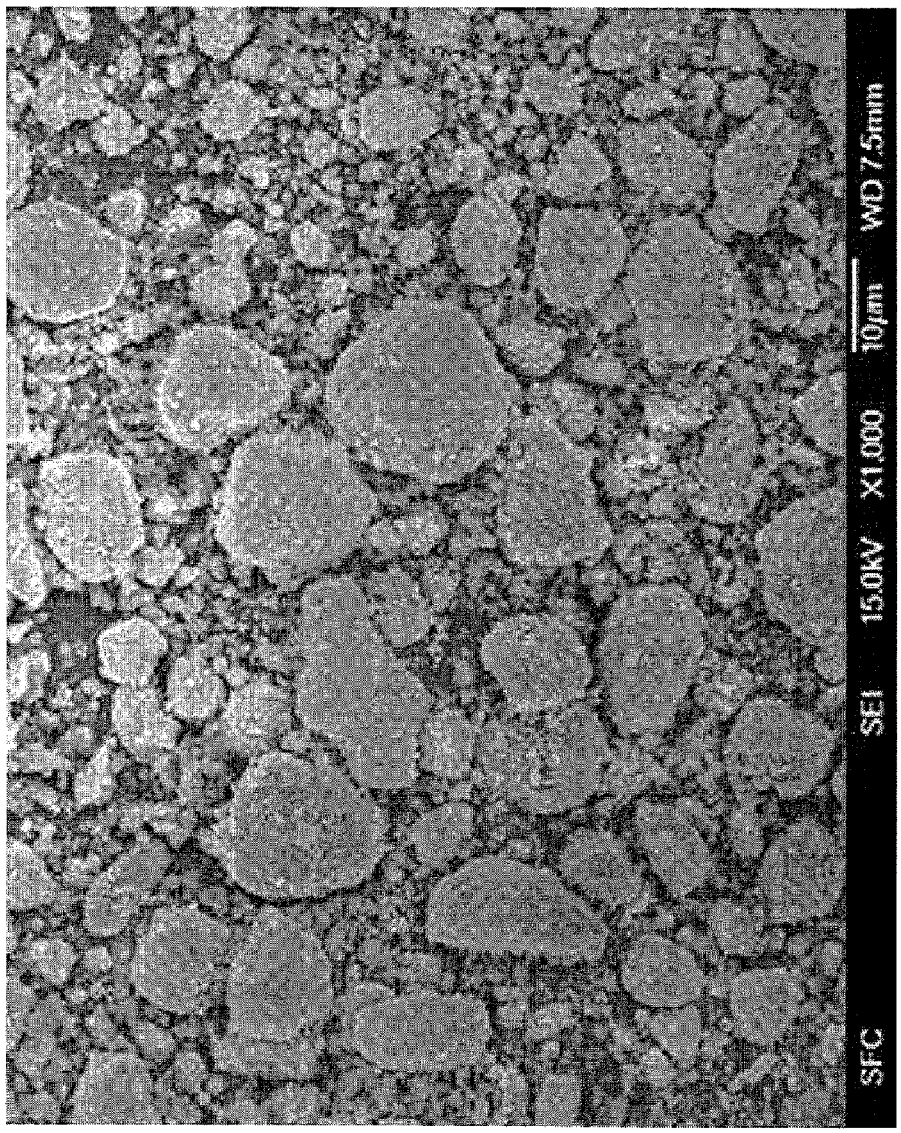

[Fig. 2]
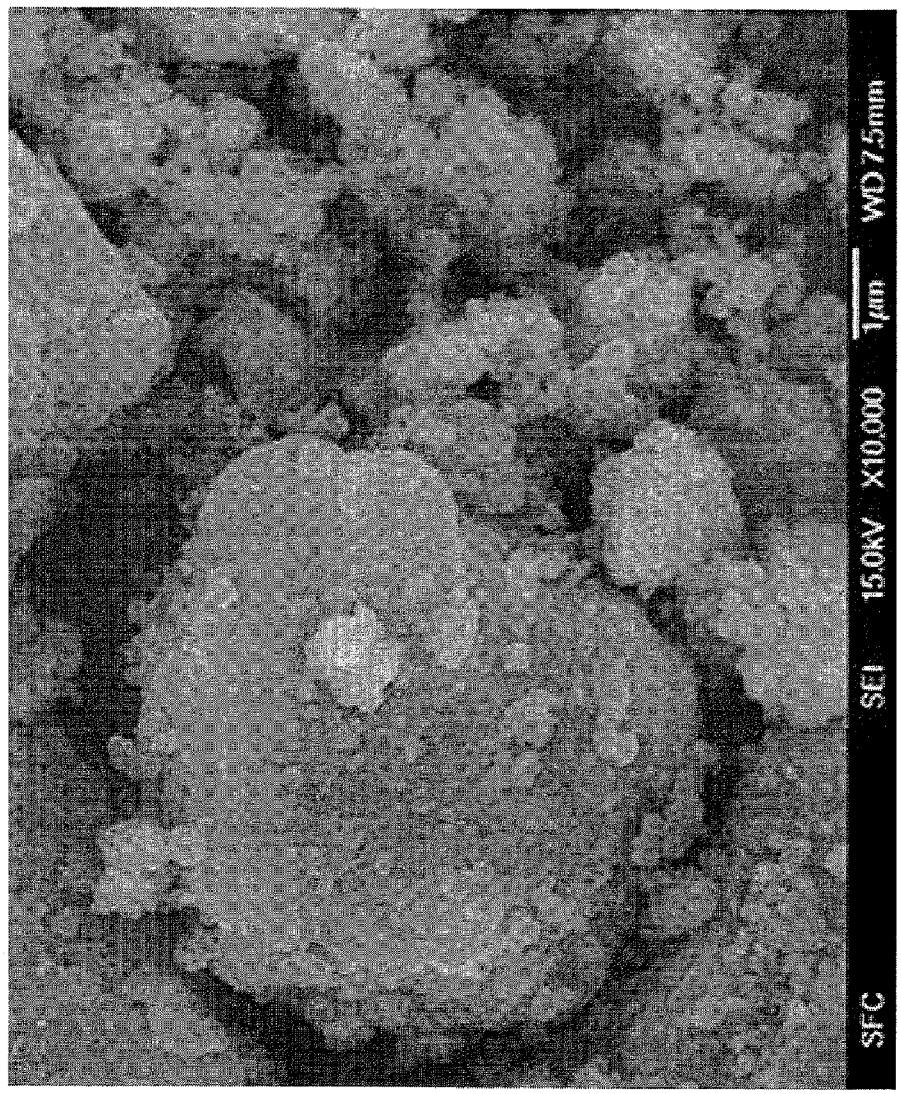

[Fig. 3]
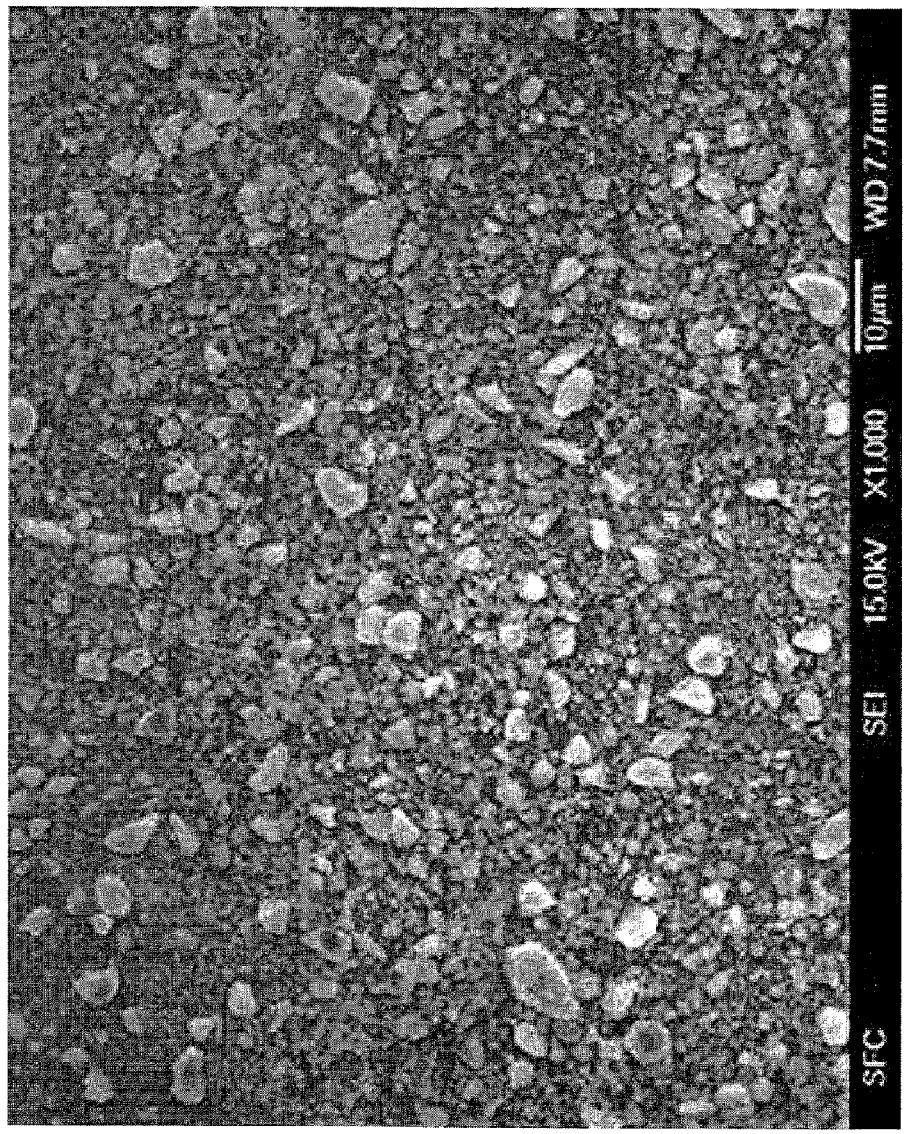

[Fig. 4]
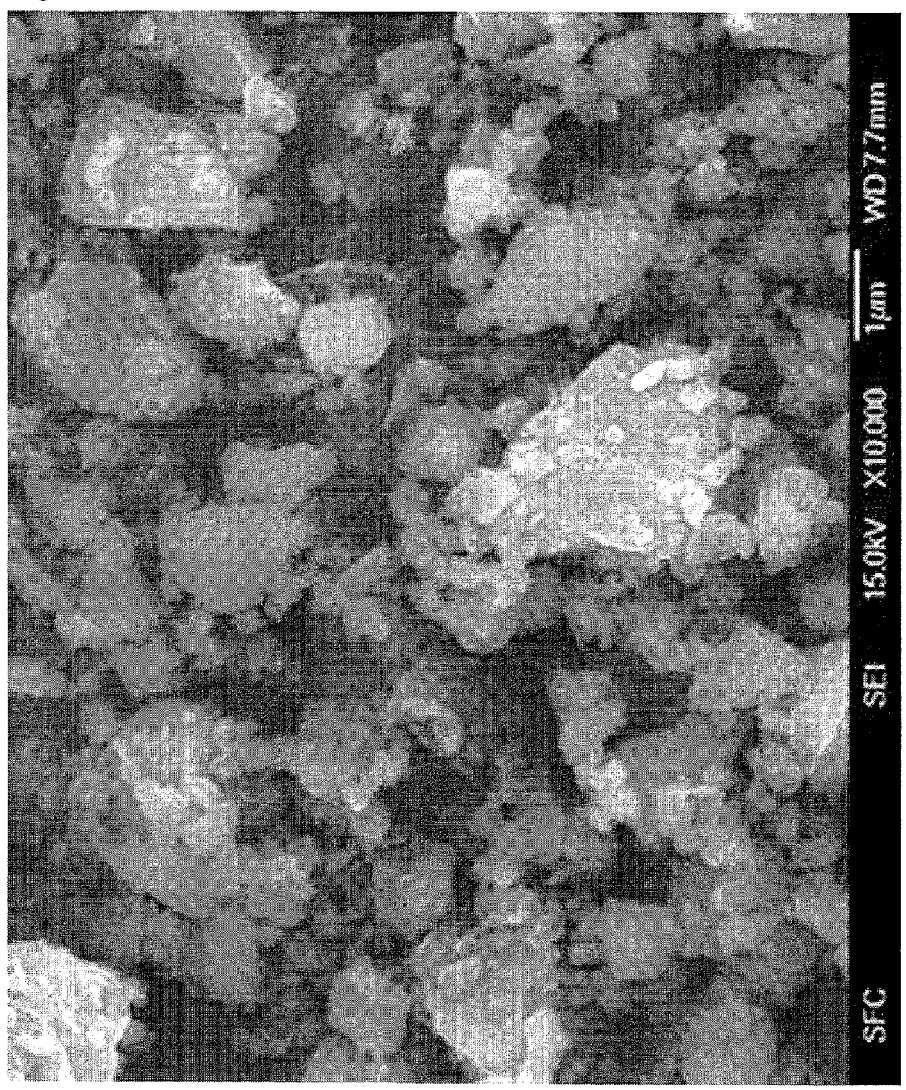

[Fig. 5]
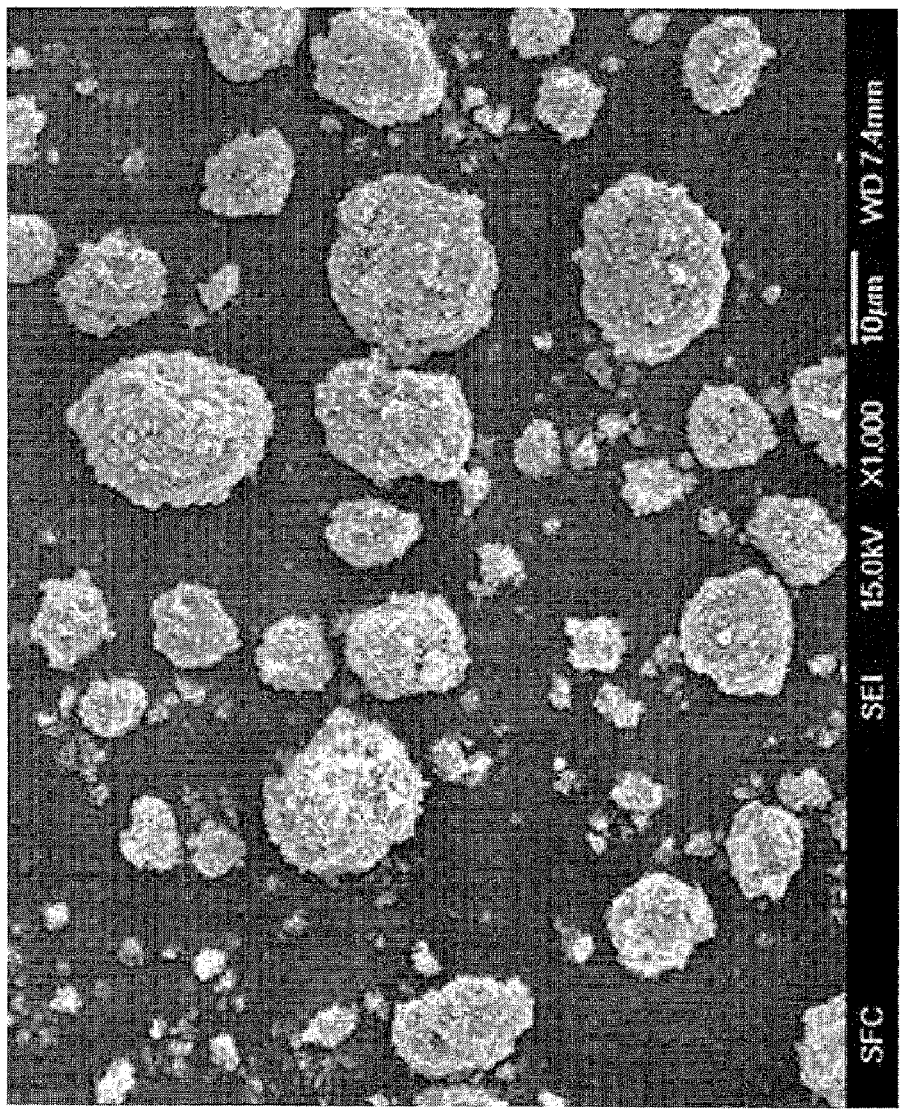

[Fig. 6]
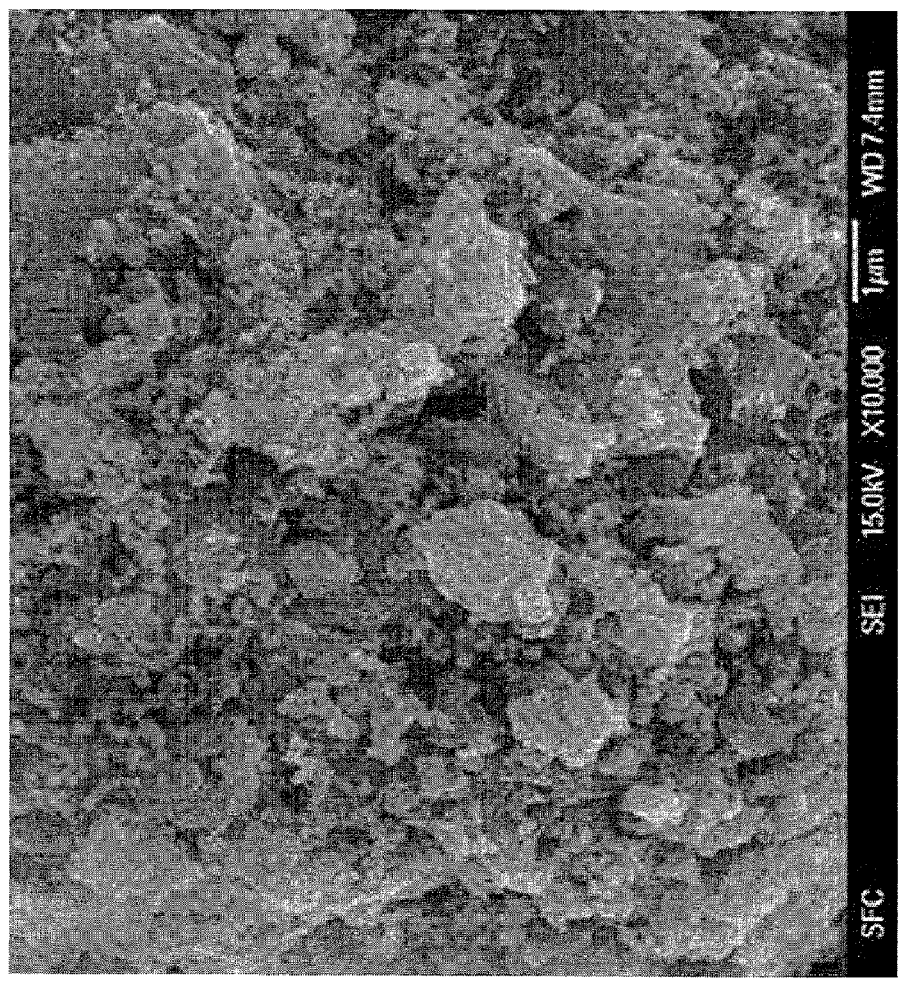

PRODUCTION METHOD FOR NEGATIVE ELECTRODE ACTIVE MATERIAL FOR LITHIUM SECONDARY BATTERY, AND LITHIUM SECONDARY BATTERY

TECHNICAL FIELD

The present invention relates to a method of producing a negative electrode active material for a lithium secondary battery and a lithium secondary battery, and more particularly, to a method of producing a negative electrode active material for a lithium secondary battery and a lithium secondary battery that may minimize surface oxidation of silicon nanoparticles.

BACKGROUND ART

Electronic, information, and communication industries have shown rapid development by manufacturing portable, small, light, and high-performance electronic devices, and demands for a lithium secondary battery that may exhibit high capacity and high performance as a power source of electronic devices have increased. A lithium secondary battery that is used while being charged/discharged by intercalation and deintercalation of lithium ions has been settled as an essential power source of medium-to-large sized devices such as electric vehicles as well as portable electronic devices for information and communication.

Graphite-based negative electrode active materials have been used as typical negative electrode materials of a lithium secondary battery, but a theoretical capacity of the negative electrode active materials is limited to 372 mAh/g. Thus, studies on high capacity materials such as silicon, tin, or a metallic complex thereof have been conducted. Also, interest in titanium and zinc oxide for considering high capacity and chemical safety, as well as a change in a nanostructure thereof having a high specific surface area has increased.

In particular, silicon is one of the high capacity negative electrode active materials of a lithium secondary battery, and a theoretical capacity of silicon based on reaction with lithium is about 4200 mAh/g.

However, silicon changes a crystalline structure during the reaction with lithium, and when silicon absorbs and stores the maximum amount of lithium during charging, the silicon converts into $Li_{4.4}Si$, and a volume of silicon expands about 4.12 folds a volume of silicon before the expansion. Mechanical stress applied to silicon during the expansion generates cracks inside and on the surface of an electrode, and the silicon shrinks back when lithium ions are discharged by discharging. When the charging/discharging cycle repeats, pulverization of the negative electrode active material may occur, and the pulverized negative electrode active material agglomerates and electrically detaches from a current collector. Also, due to an increase in resistance caused by a large change of a contact interface among negative electrode active materials, a capacity of the battery rapidly decreases as the number of charging/discharging cycles increases, and thus the cycle lifespan of the battery may be shortened.

In order to resolve the problems above, methods of controlling rapid volume change in a silicon metal material by reducing a size of particles have been tried, and as one of the methods, a method including mechanically, finely grinding silicon and dispersing the resultant in a conducting material to prepare a Si—C complex as a negative electrode active material has been tried. Particularly, during nanoparticulation of silicon, surfaces of the particles easily oxidized, which formed an oxide coating layer on the silicon particles. Thus, the initial charging/discharging efficiency of a battery decreased, and a battery capacity was reduced as well. The problem caused by the oxidation was that, when a size of the particles decrease to a nanoscale, a fraction of an oxidation coating layer volume with respect to a metal volume increases.

In order to suppress the formation of an oxide coating layer and to improve conductivity, Patent Document 1 (Japanese Patent 2000-215887) discloses a method of coating a surface of silicon particles with a carbon layer by chemical vapor deposition. However, degradation in a current collecting property and cycle characteristic deterioration along with reduction in a large volume change accompanied by charging/discharging, as problems the silicon negative electrode needs to resolve, could not be prevented.

In addition, Patent Document 2 (Japanese Patent 2005-190902) discloses a method of reducing volume expansion by designing a stack structure of silicon active materials, and Patent Document 3 (Japanese Patent 2006-216374) discloses a method of compensating for the volume change by having an empty space between a core part formed of silicon particles and a porous outer part. However, the methods that increase cycle characteristics of a negative electrode material by coating a silicon surface include a process that is not economically efficient, and capacities thereof can only achieve those way lower than a theoretical capacity of silicon, which results in low battery performance.

In this regard, it is required to develop a negative electrode active material for a lithium secondary battery that may decrease pulverization of silicon particles, has a simple formation process, and is suitable for the use in portable phones or electric vehicles, in which repeated cycle characteristics are important, by decreasing a volume change of silicon particles accompanied by charging/discharging of the lithium secondary battery.

PRIOR ART

Patent Documents (Patent Document 1) JP2000-215887 A
(Patent Document 2) JP2005-190902 A
(Patent Document 3) JP2006-216374 A

DETAILED DESCRIPTION OF THE INVENTIVE CONCEPT

Technical Problem

The present invention provides a method of producing a negative electrode active material for a lithium secondary battery that may minimize surface oxidation of silicon nanoparticles.

The present invention provides a lithium secondary battery including the negative electrode active material for a lithium secondary battery to improve the initial efficiency and life retention ratio of a battery.

Technical Solution

According to an aspect of the present invention, there is provided a method of producing a negative electrode active material for a lithium secondary battery, wherein the negative electrode active material is produced by mechanically grinding or crushing, in dry or wet conditions, particulate silicon, which is in a secondary particle state formed by agglomerating crystalline silicon primary particle and amorphous silicon primary particle.

According to another aspect of the present invention, there is provided a lithium secondary battery including the negative electrode active material thus produced.

Effects of the Invention

Metal silicon may be easily prepared into nanoparticles through a grinding process, but battery performance may deteriorate due to surface oxidation of silicon concomitant with the process. In this regard, silicon nanoparticles with minimized silicon surface oxidation may be obtained by grinding or crushing secondary particles, which are formed by agglomerating crystalline and amorphous primary silicon particles that are produced as a by-product during preparation of polysilicon. Also, the silicon nanoparticles may be used as a negative electrode active material to improve the initial efficiency and lifespan characteristics of a lithium secondary battery.

DESCRIPTION OF THE DRAWINGS

FIGS. 1 and 2 are scanning electron microscope (SEM) images of silicon particles prepared in Example 1;
FIGS. 3 and 4 are SEM images of silicon particles prepared in Example 2; and
FIGS. 5 and 6 are SEM images of silicon particles prepared in Comparative Example 1.

BEST MODE

According to an embodiment of the present invention, provided is a method of producing a negative electrode active material for a lithium secondary battery, the method including mechanically grinding or crushing particulate silicon in a secondary particle state, which is formed by agglomerating crystalline and amorphous primary silicon particles, under dry or wet conditions.

The mechanically grinding or crushing of particulate silicon may be performed under dry or wet conditions.

Under the dry conditions, as the term itself implies, a size of particles decreases in a powder (particulate) state. Under the wet conditions, a size of particles decreases in a mixture state of a powder and a diluents (liquid).

Preferably, the mechanically grinding or crushing may be performed by a milling process. The milling process may be performed by using a beads mill, a high energy ball mill, a planetary ball mill, a stirred ball mill, or a vibration mill. The beads or ball may be formed of a chemically inert material that does not react with silicon, and an example of the material may be, for example, a zirconia material. A size of the beads or ball may be, for example, in a range of 0.03 mm to 10 mm, but the size is not limited thereto.

A milling process may be performed for an appropriately time period by taking into account a size of silicon-based particles, a desired size of the final particles, or a size of a beads or a ball used in the milling process, and, for example, the milling process may be performed for 0.1 hour to 10 hours.

When the mechanically ground or crushed particles are used as a negative electrode active material, an average particle diameter ($D_{50}$) of secondary particles may be in a range of 1 μm to 15 μm. Risks of deterioration in a negative electrode mixture density and deterioration in high-speed negative electrode coating processability when the $D_{50}$ is beyond this range may be lowered. The average particle diameter is a volume average value $D_{50}$ (that is, a particle diameter or a median diameter of the 50% cumulative volume) in the particle size distribution measurement by using a laser diffraction method.

When a process time of the grinding or crushing process increases, a diluent (liquid) that may suppress surface oxidation of silicon particles may be introduced. The diluent protects surfaces exposed by the grinding or crushing process from oxygen in the air to suppress surface oxidation of silicon particles. The diluent (liquid) may be an organic-based solvent having a low viscosity. In particular, the viscosity of the diluent may be, preferably, 500 mpa·s or lower. When the viscosity of the diluent is higher than 500 mpa·s, the grinding kinetic energy is absorbed by the diluent, which may decrease grinding and crushing effects of the silicon particles.

When a dry or wet grinding and crushing process time increases, the time of exposure to oxygen in the air increases, which makes the oxidation suppression effect insignificant, and, when a wet grinding and crushing process time exceeds 10 hours, battery characteristics may be deteriorated.

The particulate silicon in a secondary particle state, which is formed by agglomerating crystalline and amorphous silicon primary particles, may be obtained as a silicon product by using a fluidized bed reactor (FBR) method. The product is mixed-phase silicon secondary particles that are agglomerated by introducing a polycrystalline silicon seed in an argon flow in a FBR having an internal temperature of 400° C. or higher, infeeding monosilane, mix-growing amorphous silicon primary particles and crystalline silicon primary particles, wherein amorphous silicon primary particles are prepared by thermal decomposition of the monosilane and the crystalline silicon primary particles are prepared by growing the seed. The product is classified by using a classifier (TC-15 available from Nisshin Engineering Co., Ltd.) to obtain a silicon powder having an average particle diameter ($D_{50}$) of 10 μm.

A specific surface area of the silicon secondary particles measured by a Brunauer, Emmett & Teller (BET) measurement may be, preferably, in a range of 2 $m^2$/g to 50 $m^2$/g. When the specific surface area of the silicon secondary particles is lower than 2 $m^2$/g, a surface area for reacting with lithium ions may decrease, which may then result in deterioration of reactivity. When the specific surface area of the silicon secondary particles is higher than 50 $m^2$/g, both initial efficiency and cycle characteristics may degrade due to an increase in a binder consumption amount for maintaining a current collecting property and deterioration of preparation characteristics of a negative electrode for a lithium secondary battery.

According to another embodiment of the present invention, provided is a lithium secondary battery including a negative electrode active material prepared by using the method.

A negative electrode for a lithium secondary battery is prepared by forming a negative electrode active material layer that includes the negative electrode active material on an electrode current collector.

The electrode current collector may be selected from the group consisting of copper foil, nickel foil, stainless steel, titanium foil, nickel foam, copper foam, a polymer substrate coated with a conductive metal, and combinations thereof.

Also, a binder and, optionally, a conducting material may be included together with the negative electrode active material in an active material. Examples of the binder may include polytetrafluoroethylene (PTFE), polyvinylidene fluoride (PVdF), cellulose, polyethylene, polypropylene, styrene butadiene rubber (SBR), polyimide, polyacrylic acid, poly methylmethacrylate (PMMA), poly acrylonitrile (PAN), styrene butadiene rubber (SBR), carboxymethyl cellulose (CMC), and a water-soluble polyacrylic acid (PAA), but the examples of the binder are not limited thereto.

Examples of the conducting material may include natural graphite, artificial graphite, carbon black, acetylene black, Ketjen black, carbon fibers, a metal powder or metal fibers of metal such as copper, nickel, aluminum or silver, or a conducting material such as a polyphenylene derivative, and a mixture thereof.

The negative electrode maybe prepared by dispersing, optionally, a conducting material and a binder into N-methyl-2-pyrrolidone (NMP) or a solvent such as an organic solvent or water to prepare a slurry composition; coating the slurry composition on an electrode current collector, and drying and pressing the electrode current collector.

The lithium secondary battery may include a negative electrode including the negative electrode active material; a positive electrode including a positive electrode active material that is capable of intercalating and deintercalating lithium ions; a separator; and an electrolyte including a non-aqueous organic solvent and a lithium salt. Here, materials for the positive electrode, the separator, and the electrolyte and a shape of the battery are not limited.

Hereinafter, embodiments of the present invention will be described in detail by referring to the following examples, but the embodiments are not limited to the examples.

EXAMPLE 1

An amorphous-crystalline mixed-phase silicon product ($D_{50}$ of 9.9 μm) obtained from thermal decomposition of polysilicon and a silane-based gas by using an FBR method was dry-ground in a planetary ball mill having an internal volume of 100 ml with beads in a size of 5 mm for 30 minutes to obtain silicon particles having $D_{50}$ of 7.7 μm.

The silicon particles thus obtained, an artificial graphite conducting material, and a polyimide binder were prepared at a weight ratio of 40:45:15. The binder was dissolved in N-methyl-2-pyrrolidone (NMP, 99%, Aldrich Co.), as a solvent, by using a mixer (Thinky mixer) for 10 minutes, and then the ground particles and the conducting material was added thereto and stirred for 15 minutes to obtain a homogenous slurry.

The slurry thus prepared was applied to a copper foil by using a blade, dried in an oven at 110° C. for 20 minutes to evaporate the solvent, and the resultant was pressed by using a roll-press to prepare a negative electrode. The negative electrode thus prepared was dried in a vacuum oven at 120° C. for 12 hours. A positive electrode was prepared by using a lithium metal foil. The dried negative electrode was cut to have a diameter of 1.6 cm, and the positive electrode and a solution prepared by dissolving 1M $LiPF_6$ in ethylene carbonate (EC)/ethylmethyl carbonate (EMC)/dimethyl carbonate (at a v/v ratio of 25/35/40) and vinylene carbonate (VC, at 2 weight %), as an electrolyte, were used to prepare a coin-type lithium secondary battery.

EXAMPLE 2

An amorphous-crystalline mixed-phase silicon product ($D_{50}$ of 9.9 μm) obtained from thermal decomposition of polysilicon and a silane-based gas by using an FBR method was dry-primary-ground in a planetary ball mill having an internal volume of 100 ml with beads in a size of 5 mm for 30 minutes, secondary-ground with beads in a size of 3 mm for 30 minutes, and dry-tertiary-ground with beads in a size of 1 mm for 30 minutes to obtain silicon particles having $D_{50}$ of 2.1 μm.

A lithium secondary battery was prepared in the same manner as in Example 1, except that the silicon particles thus obtained were used as a negative electrode active material.

EXAMPLE 3

An amorphous-crystalline mixed-phase silicon product ($D_{50}$ of 9.9 μm) obtained from thermal decomposition of polysilicon and a silane-based gas by using an FBR method was wet-primary-ground in a beads ball mill having an internal volume of 150 ml with beads in a size of 5 mm for 15 minutes, and N-methyl-2-pyrrolidone (NMP, 99%, Aldrich Co.) was used as a wet diluent, to obtain silicon particles having $D_{50}$ of 1.8 μm.

A lithium secondary battery was prepared in the same manner as in Example 1, except that the silicon particles thus obtained were used as a negative electrode active material.

COMPARATIVE EXAMPLE 1

A lithium secondary battery was prepared in the same manner as in Example 1, except that an amorphous-crystalline mixed-phase silicon product ($D_{50}$ of 9.9 μm) obtained from thermal decomposition of polysilicon and a silane-based gas by using an FBR method was used as a negative electrode active material.

<Particle Diameter Distribution Analysis>

SEM images of the silicon particles prepared in Examples 1 and 2 are each shown in FIGS. 1 and 2 and FIGS. 3 and 4, respectively. SEM images of the silicon particles prepared without an additional grinding process as in Comparative Example 1 are shown in FIGS. 5 and 6.

The grinding time and the results of particle diameter distribution analysis performed on the silicon particles of Examples 1 to 3 are shown in Table 1.

TABLE 1

|  | Grinding time | $D_{10}$ (μm) | $D_{50}$ (μm) | $D_{90}$ (μm) | Specific surface area BET (m2/g) |
|---|---|---|---|---|---|
| Example 1 | 30 minutes | 1.13 | 7.70 | 17.19 | 4.64 |
| Example 2 | 90 minutes | 0.41 | 2.05 | 4.68 | 6.45 |
| Example 3 | 15 minutes | 0.35 | 1.8 | 5.5 | 7.01 |
| Comparative Example 1 | — | 1.46 | 9.9 | 21.31 | 3.72 |

<Battery Characteristics Evaluation>

The coin-type lithium secondary batteries prepared in Examples 1 and 2 and Comparative Example 1 were maintained in a constant-temperature chamber at 25° C. for 24 hours, and a secondary battery charging/discharging testing device (available from Toyo System) was used to set a voltage range of the test cells to be 0.02 V to 1.5 V, and the cells were charged/discharged in a constant current/constant voltage (CC/CV) mode at a current of 0.5 C in the first cycle to obtain an initial charging/discharging efficiency. After the first cycle, the cells were charged/discharged in a CC/CV mode at a current of 0.5 C, and the cycle was repeated 20 times.

A ratio of a discharge capacity with respect to a primary charge capacity was evaluated as an initial efficiency, and a capacity retention ratio during the 20$^{th}$ cycle was evaluated. The results are shown in Table 2.

TABLE 2

| | Initial efficiency (%) | Discharge capacity (mAh/cc) | Charge capacity (mAh/cc) | 20$^{th}$ cycle capacity retention ratio (%) | $D_{50}$ (μm) |
|---|---|---|---|---|---|
| Example 1 | 85.8 | 1468 | 1711 | 73.4 | 7.70 |
| Example 2 | 85.2 | 1508 | 1771 | 71.7 | 2.05 |
| Example 3 | 86.0 | 1505 | 1750 | 72.8 | 1.80 |
| Comparative Example 1 | 84.1 | 1340 | 1594 | 59.8 | 9.95 |

As shown in Table 1, the ground silicon particles prepared in Examples 1 to 3 had a similar initial efficiency with that of the silicon particles prepared in Comparative Example 1. In particular, it may be known that the silicon particles prepared in Examples 1 to 3 had significantly improved cycle lifespan characteristics, compared to that of the silicon particles of Comparative Examples that did not undergo a grinding process. The initial efficiency indicates that surface oxidation of particles may be minimized by a short dry/wet grinding process, and the lifespan characteristics improved because a contact area with a conducting material in an electrode increased along with an increase in a specific surface area of the silicon particles that were ground at an appropriate size, which remained interfacial resistance low.

The invention claimed is:

1. A method of preparing a negative electrode active material for a lithium secondary battery, the method comprising mechanically grinding or crushing, particulate silicon, which is in a secondary particle state formed by agglomerating crystalline and amorphous silicon primary particles, under dry or wet conditions; wherein the mechanically grinding or crushing is performed by a milling process and wherein the milling process is performed by using a bead mill or a ball mill; wherein an average particle diameter (D50) of negative electrode active material particles after the mechanically grinding or crushing is in a range of 1 μm to 15 μm; and wherein an additive that suppresses surface oxidation of silicon particles is added during the mechanically grinding or crushing.

2. The method of claim 1, wherein the additive comprises coal tar pitch.

3. The method of claim 1, wherein the particulate silicon in a secondary particle state, which is formed by agglomerating crystalline and amorphous silicon primary particles, is obtained as a silicon product by using a fluidized bed reactor (FBR) method.

4. A negative electrode active material for a lithium secondary battery prepared by using the method of claim 1.

5. A negative electrode active material for a lithium secondary battery prepared by using the method of claim 2.

6. A negative electrode active material for a lithium secondary battery prepared by using the method of claim 3.

7. A lithium secondary battery comprising the negative electrode active material of claim 4.

* * * * *